March 23, 1943.  J. L. DRAKE  2,314,327
GLASS CUTTING APPARATUS
Filed April 7, 1941  2 Sheets-Sheet 1

Inventor
JOHN L. DRAKE.
By Frank Fraser
Attorney

March 23, 1943.   J. L. DRAKE   2,314,327
GLASS CUTTING APPARATUS
Filed April 7, 1941   2 Sheets-Sheet 2

Inventor
JOHN L. DRAKE
By Frank Fraser
Attorney

Patented Mar. 23, 1943

2,314,327

UNITED STATES PATENT OFFICE 2,314,327

GLASS CUTTING APPARATUS

John L. Drake, Toledo, Ohio, assignor to Libbey-Owens-Ford Glass Company, Toledo, Ohio, a corporation of Ohio Application April 7, 1941, Serial No. 387,194

10 Claims. (Cl. 49—52)

The present invention relates broadly to glass cutters and more particularly to that type of cutter which is held in the hand and drawn across a sheet or plate of glass to be cut.

This type of hand cutter ordinarily comprises an elongated handle provided at one end thereof with a head carrying the cutting tool consisting either of a diamond or a rotatable steel wheel. In cutting glass sheets to a predetermined size and/or shape with this form of cutter, the cutter is drawn across the glass with the head thereof held firmly by the operator against a straight edge or suitably shaped template. To effect the accurate, uniform cutting of the glass with such type of cutter, it is essential that the cutter not only be maintained in proper engagement with the straight edge or template during the entire cutting operation but also that the cutter be held straight or perpendicular with respect to the glass sheet. If this is not done, the glass sheet may be cut either too large, requiring excessive grinding of the edges thereof, or too small so that it is entirely wasted.

It is the aim and principal object of this invention to provide a hand cutter of the above character having novel means cooperating with the template or straight edge for facilitating and expediting the cutting of glass sheets or plates rapidly, accurately, and uniformly and wherein the accuracy of the cut will not be dependent wholly upon the skill of the operator.

Another important object of the invention is the provision of a hand cutter of the above character provided with magnetic means cooperating with the template or straight edge for effectively maintaining said cutter in contact therewith during the cutting operation and for also maintaining the said cutter straight or perpendicular with respect to the glass sheet at all times.

Other objects and advantages of the invention will become more apparent during the course of the following description when taken in connection with the accompanying drawings.

In the drawings wherein like numerals are employed to designate like parts throughout the same:

Figure 1:
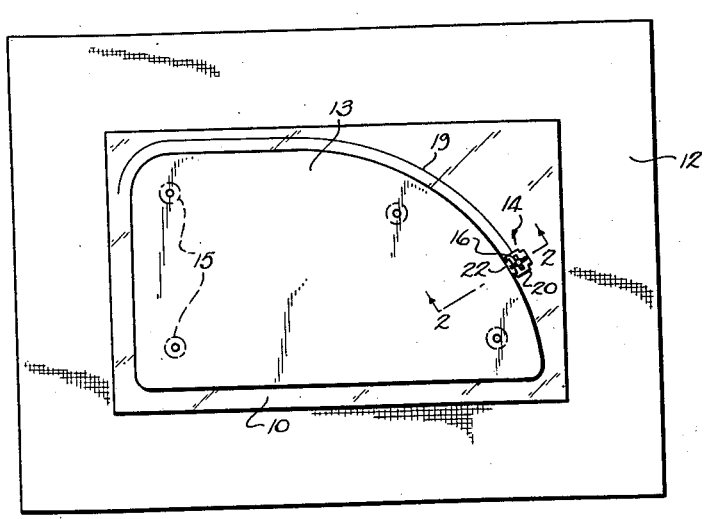
Fig. 1 is a plan view of one type of cutter provided by the present invention and shown in association with a template.
Figure 2:
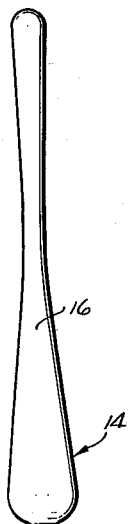
Fig. 2 is a vertical section taken substantially on line 2—2 of Fig. 1.
Figure 2:
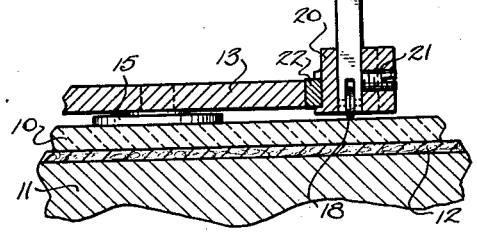

With reference now to the drawings and particularly to Figs. 1 and 2, a sheet of glass 10 to be cut is supported upon the horizontal top 11 of a suitable table, the upper surface of which is preferably covered with a layer of felt or the like 12 to prevent scratching or marring of the under-surface of the glass sheet. The numeral 13 designates a template of the desired shape and size which is placed upon the glass sheet 10 and serves as a guide for the cutter, designated in its entirety by the numeral 14. The template 13 comprises a flat sheet or plate of steel and carries upon its under-side a plurality of rubber buttons 15 which engage the upper surface of the glass sheet 10.

The cutter 14 is of the hand operated type and includes an elongated handle 16 provided at its lower end with a cutter head 17 carrying the cutting tool 18 which is preferably, though not necessarily, in the form of a freely rotatable, small beveled edge, hard steel wheel. This form of cutter is of conventional construction and is adapted to be held in the hand of the operator and moved over the sheet of glass 10, being guided by the template 13 to score the sheet along the line indicated at 19.

In accordance with this invention, there is carried by the head 17 of cutter 14 a fixed guide block 20 substantially rectangular and having a vertical opening through which the cutter head is inserted. The guide block 20 is secured to the cutter head by a set screw or the like 21. Carried upon the inner side of the guide block is a metal holding member 22 comprising a permanent magnet and adapted to engage and be guided by the template during the cutting operation. The outer surface of the metal member 22 is preferably curved to afford a broader contacting surface for engagement with the outer edge of the template.

When using the cutter 14, the operator places the holding member 22 against the edge of the steel template 13 in the manner shown in Figs. 1 and 2, and then draws the cutter over the glass sheet to score the same. The member 22 will magnetically adhere to the edge of the template during movement of the cutter over the glass and in this way the operator will be greatly aided in maintaining the cutter in firm engagement with the template during the cutting operation. Likewise, the magnetic adherence between the cutter and template will serve to maintain the cutter in a vertical position and lessen the danger of tilting thereof by the operator during cutting.

Figure 3:
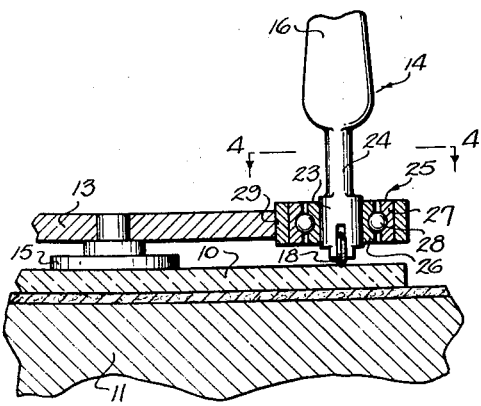
Fig. 3 is a vertical section through a modified form of cutter also embodying the invention.
Figure 4:
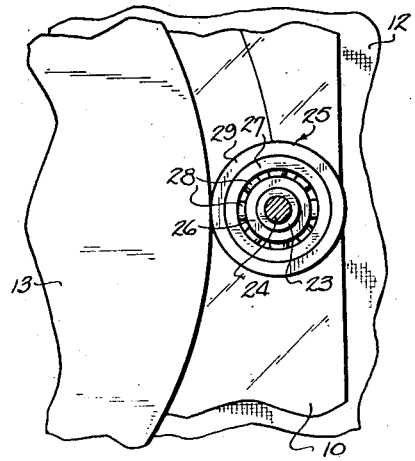
Fig. 4 is a horizontal section taken substantially on line 4—4 of Fig. 3.

In the form of invention illustrated in Figs. 3 and 4, the template 13 is the same as described hereinabove, while the cutter 14 is provided at the lower end of handle 16 with a cylindrical head 23 connected with said handle by a reduced shank 24. Carried by the head 23 is a guide roller 25 including an inner ring 26 fixed to said head and an outer ring 27 freely rotatable upon ball bearings 28 disposed between said inner and outer rings. Encircling and secured to the outer ring 28 is a cylindrical metal holding member 29 in the form of a permanent magnet and which is adapted to magnetically adhere to the outer edge of the metal template 13 during the cutting operation in the same manner as described above in connection with the form of invention shown in Figs. 1 and 2. The provision of the roller 25, however, serves to facilitate the movement of the cutter along the edge of the template.

Figure 5:
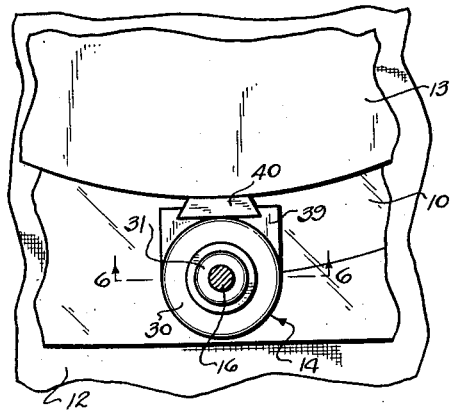
Fig. 5 is a horizontal section through still another form of cutter.
Figure 6:
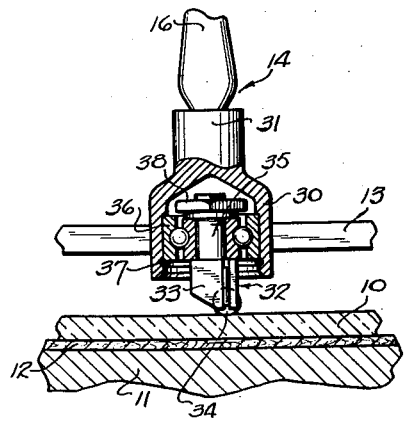
Fig. 6 is a vertical section taken substantially on line 6—6 of Fig. 5.

In the form of invention shown in Figs. 5 and 6, the cutter head 30 carried at the lower end of the handle 16 of cutter 14 is in the form of a cylindrical housing open at its lower end and formed at its upper end with a collar 31 for receiving the lower end of said handle therein. Mounted within the housing 30 is a cutting unit 32 comprising a body portion 33 carried at the lower end of a cutter holder 35 and provided with a freely rotatable steel cutting wheel 34. The vertical cutter holder 35 is rotatable within a ball bearing assembly 36 secured within the housing 30 by a split ring 37. The upper end of the cutter holder 35 has threaded thereupon a nut 38 for securing the cutting unit 32 in place.

A very desirable feature of this construction is that the cutter holder 35 is mounted to turn freely within the ball bearing assembly 36, as a result of which the cutting wheel 34 will automatically adjust itself to follow any given course or direction. Thus, the horizontal axis of rotation of the cutting wheel is laterally offset with respect to the vertical axis of rotation of the cutter holder so that said cutting wheel is caused to trail said cutter holder upon horizontal movement of the cutter and be thereby constantly maintained in its most effective cutting position. By means of this arrangement, the cutting wheel will remain in tangential relation to the line of cut at all times. That is to say, since the cutting wheel is out of alignment with the vertical axis about which the cutter holder rotates, the said wheel will lag behind upon horizontal movement of the cutter and thus hold its proper relation to the line of cut.

Formed upon one side of the housing 30 is a rectangular lug 39 carrying the permanently magnetized holding member 40 adapted to engage and adhere to the edge of the metal template 13 during the cutting operation. Thus, the same advantages may be gained with this form of cutter as with the cutters illustrated in Figs. 2 and 3.

Figure 7:
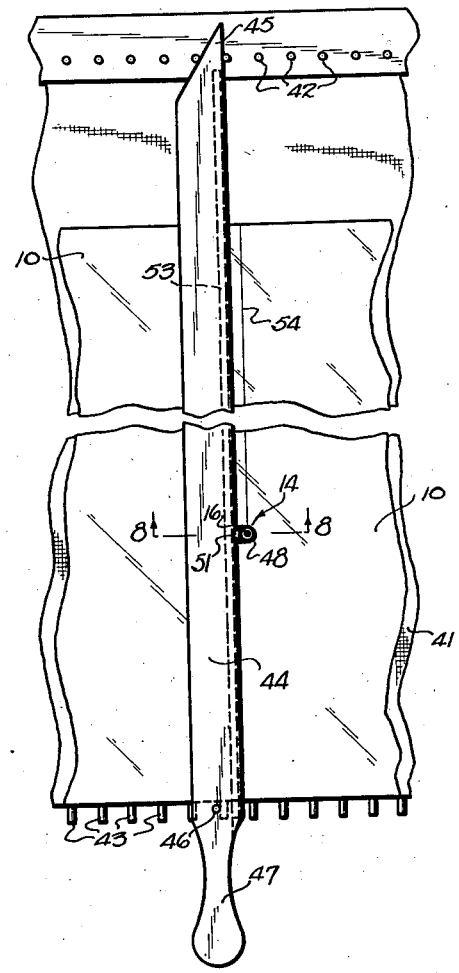
Fig. 7 is a plan view of still another form of cutter shown in association with a straight edge.
Figure 8:
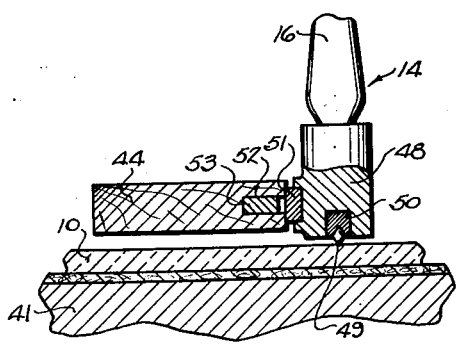
Fig. 8 is a vertical section taken substantially on line 8—8 of Fig. 7.

In Figs. 7 and 8, the hand cutter 14 cooperates with a straight edge 44 to effect the scoring of the glass sheet 10 while supported upon the top of a table 41. Arranged along the back of the table is a series of spaced vertical pins 42 while arranged along the front of said table is a series of forwardly directed, horizontal pins 43 disposed in alignment with the vertical pins 42. Extending between the pins 42 and 43 and resting upon the table is the straight edge 44 which serves as a cutter guide. The rear end of the straight edge is beveled as at 45 and adapted to be received between the upstanding pins 42, while carried at the forward end thereof is a vertical pin 46 which is received between adjacent, forwardly directed pins 43, so that the straight edge may be maintained in the desired position during the cutting operation. The forward end of the straight edge may be formed with a suitable handle 47.

The handle 16 of cutter 14 is provided at its lower end with a head 48 carrying the cutting diamond 49 set in a body of suitable material 50. Secured to one side of the cutter head 48 is the permanent magnet 51, while inserted within a longitudinally extending recess 52 in the adjacent edge of the straight edge is a steel strip 53. With this arrangement, as the cutter 14 is drawn along the straight edge 44 to effect scoring of the glass sheet as indicated at 54, the magnet 51 will be held in contact with said straight edge by the magnetic attraction between the steel strip 53 and permanent magnet 51. In this way, the operator will not only be aided in maintaining the cutter against the straight edge but, in addition, the holding of the cutter in a vertical position during the cutting operation will also be facilitated.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In glass cutting apparatus, a hand cutter adapted to be drawn across the glass to score the same and guided in its travel by a guide member, and a permanently magnetized metal holding member carried by said cutter and adapted to be magnetically adhered to the guide member as said cutter is drawn over the glass.

2. In glass cutting apparatus, a hand cutter adapted to be drawn across the glass to score the same and guided in its travel by a guide member, said cutter including a head and a tool carried by said head, and a permanently magnetized metal holding member carried by said cutter head and adapted to be magnetically adhered to the guide member as said cutter is drawn over the glass.

3. In glass cutting apparatus, a hand cutter adapted to be drawn across the glass to score the same and guided in its travel by a guide member, and a stationary, permanently magnetized metal holding member carried by said cutter and adapted to be magnetically adhered to the guide member as said cutter is drawn over the glass.

4. In glass cutting apparatus, a hand cutter adapted to be drawn across the glass to score the same and guided in its travel by a guide member, said cutter including a head and a tool carried by said head, and a stationary, permanently magnetized metal holding member carried by said cutter head and adapted to be magnetically adhered to the guide member as said cutter is drawn over the glass.

5. In glass cutting apparatus, a cutter adapted to be drawn across the glass to score the same and guided in its travel by a guide member, and a permanently magnetized metal holding member rotatably carried by said cutter and adapted to be magnetically adhered to the guide member as said cutter is drawn over the glass.

6. In glass cutting apparatus, a cutter adapted to be drawn across the glass to score the same and guided in its travel by a guide member, said cutter including a head and a tool carried by said head, and a permanently magnetized metal holding member rotatably carried by said cutter head and adapted to be magnetically adhered to the guide member as said cutter is drawn over the glass.

7. In glass cutting apparatus, a hand cutter adapted to be drawn across the glass to score the same and guided in its travel by a guide member, said cutter including a head and a tool carried by said head, a fixed guide block carried by said cutter head, and a permanently magnetized metal holding member carried by said guide block and adapted to be magnetically adhered to the guide member as said cutter is drawn over the glass.

8. In glass cutting apparatus, a cutter adapted to be drawn across the glass to score the same and guided in its travel by a guide member, said cutter including a head and a tool carried by said head, a freely rotatable guide roller carried by said cutter head, and a permanently magnetized metal holding member secured to said roller and adapted to be magnetically adhered to the guide member as said cutter is drawn over the glass.

9. In glass cutting apparatus, a cutter adapted to be drawn across the glass to score the same and guided in its travel by a guide member, said cutter including a handle provided with a head at the lower end thereof, a cutter holder carried by said head and freely rotatable about a vertical axis, a cutting wheel carried by said cutter holder and rotatable about a horizontal axis in offset relation to the vertical axis about which said cutter holder rotates, and a permanently magnetized metal holding member carried by said cutter head and adapted to be magnetically adhered to the guide member as said cutter is drawn over the glass.

10. In glass cutting apparatus, a cutter adapted to be drawn across the glass to score the same and guided in its travel by a guide member, said cutter including a handle provided with a head at the lower end thereof in the form of a housing, a ball bearing assembly mounted in said housing, a cutter holder carried by said ball bearing assembly and rotatable about a vertical axis, a cutting wheel carried by said cutter holder and rotatable about a horizontal axis in offset relation to the vertical axis about which said cutter holder rotates, and a permanently magnetized metal holding member secured to said housing and adapted to be magnetically adhered to the guide member as said cutter is drawn over the glass.

JOHN L. DRAKE.